United States Patent
Hessler et al.

(10) Patent No.: US 12,207,084 B2
(45) Date of Patent: Jan. 21, 2025

(54) WIRELESS DEVICE AND NETWORK NODE FOR VERIFICATION OF A DEVICE AS WELL AS CORRESPONDING METHODS IN A WIRELESS COMMUNICATION SYSTEM

(71) Applicant: Telefonaktiebolaget LM Ericsson (publ), Stockholm (SE)

(72) Inventors: Martin Hessler, Linköping (SE); Pål Frenger, Linköping (SE); Nicklas Johannson, Brokind (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 178 days.

(21) Appl. No.: 17/437,695

(22) PCT Filed: Mar. 11, 2019

(86) PCT No.: PCT/EP2019/055982
§ 371 (c)(1),
(2) Date: Sep. 9, 2021

(87) PCT Pub. No.: WO2020/182285
PCT Pub. Date: Sep. 17, 2020

(65) Prior Publication Data
US 2022/0360981 A1    Nov. 10, 2022

(51) Int. Cl.
*H04L 29/00* (2006.01)
*H04W 12/0431* (2021.01)
*H04W 12/71* (2021.01)

(52) U.S. Cl.
CPC ....... *H04W 12/0431* (2021.01); *H04W 12/71* (2021.01)

(58) Field of Classification Search
CPC .......................... H04W 12/0431; H04W 12/71
(Continued)

(56) References Cited

U.S. PATENT DOCUMENTS

2010/0046443 A1* 2/2010 Jia .................. H04W 76/11
                                                    368/10
2014/0157393 A1* 6/2014 Whitcomb ............ H04L 9/0894
                                                    726/9

FOREIGN PATENT DOCUMENTS

WO    2013139071 A1    9/2013
WO    2018096311 A1    5/2018

OTHER PUBLICATIONS

International Search Report and Written Opinion dated Nov. 28, 2019 for International Application No. PCT/EP2019/055982 filed Mar. 11, 2019, consisting of 13—pages.
(Continued)

*Primary Examiner* — Jeffrey C Pwu
*Assistant Examiner* — Michael D Anderson
(74) *Attorney, Agent, or Firm* — Weisberg I.P. Law, P.A.

(57) ABSTRACT

The present invention relates to a method and wireless device for supporting verification of a device as well as to a method and a network node. It is desired to enable the reliable verification of a device. The method at the device includes transmitting the wireless device identifier; calculating verification information from a random bit sequence by using a verification function associated with the wireless device identifier, wherein the verification function uses the cryptographic key; transmitting a message including the verification information to a trusted network node over a secure connection; and wherein the secure connection is established by using a trusted network identifier or by using a network encryption key associated with a trusted network identifier.

24 Claims, 8 Drawing Sheets

(58) Field of Classification Search
USPC .............................................................. 726/2
See application file for complete search history.

(56) References Cited

OTHER PUBLICATIONS

3GPP TR 33.868 V12.1.0; 3rd Generation Partnership Project; Technical Specification Group Services and System Aspects; Study on security aspects of Machine-Type Communications (MTC) and other mobile data applications communications enhancements (Release 12); Jun. 2014, consisting of 116—pages.

3GPP TSG SA WG3 Meeting #9 S3-99510; Title: 3GPP terminal identity security: levels, requirements and mechanisms; Agenda item: Terminal security 8.3; Source: BOSCH Telecom; Document for: Deiscussion/decision; Date and Location: Dec. 7-9, 1999, consisting of 7—pages.

* cited by examiner

WIRELESS DEVICE AND NETWORK NODE FOR VERIFICATION OF A DEVICE AS WELL AS CORRESPONDING METHODS IN A WIRELESS COMMUNICATION SYSTEM

CROSS-REFERENCE TO RELATED APPLICATION

This application is a Submission Under 35 U.S.C. § 371 for U.S. National Stage Patent Application of International Application Number: PCT/EP2019/055982, filed Mar. 11, 2019 entitled "WIRELESS DEVICE AND NETWORK NODE FOR VERIFICATION OF A DEVICE AS WELL AS CORRESPONDING METHODS IN A WIRELESS COMMUNICATION SYSTEM," the entirety of which is incorporated herein by reference.

TECHNICAL FIELD

The present invention relates to a method and wireless device for supporting verification of one or more devices in a wireless communication system as well as to a method and network node. The present invention further relates to a system comprising a wireless device and a network node as well as computer program.

BACKGROUND

With the ever increasing demands from networked society, either on huge traffic volume or very low latency or both, mobile networking needs to continuously evolve to fulfil the requirements. For example, the Next Generation Mobile Networks Alliance defines requirements for 5G networks (5th generation mobile networks or 5th generation wireless systems) which are new networks surpassing current 4G at least in terms of data rate, number of simultaneous connections and spectral efficiency. With the increase in wireless devices and their use in simple and cheap applications, security of the network becomes more and more important.

Currently, within 3GPP there are good mechanisms for maintaining security based upon a shared secret between the network and a wireless device, such as user equipment, UE. The security system is based on a SIM (subscriber identity module) acting as a security module placed on a detachable or embedded SIM-card which can be used to establish a secure connection and identify the wireless device. The secure connection is usually established by the core network authenticating the wireless device. The result of the authentication is that both the core network and the wireless device generate keys to be used for all active mode communication, between the wireless device and the core network as well as between the wireless device and the radio access network (RAN).

For idle mode operation there is a concern as the wireless device relies on the broadcast messages transmitted to maintain tracking of the network nodes etc.

In paging a wireless device identifies a base station as node of the network and listens for paging messages. Thus, if the wireless device is addressed in a paging message, the wireless device then sends a page response to the core network node which then allows the core network node to deliver downlink data that e.g. may include a trigger causing the wireless device to perform a certain action such as sending of a measurement report. A problem may then occur if fake broadcast messages are sent to the wireless device, e.g. through a fake base station.

On the other hand, also wireless devices may pose security risks in the network, since they may become compromised which is usually not easily detectable by the network.

Compromised wireless devices are a security threat both to end users in possession of a compromised wireless device but also to the network and other users.

A wireless device is often divided into one part containing the radio functionality and an application part running both system and end-user applications. This has traditionally added security by keeping this separation. However, it is foreseen that in the future low cost wireless devices, e.g. IoT devices, in particular for simple applications, such as for household appliances, can be less secure due to cost cuts in the hardware architecture.

But even if this type of separation stops a compromised application from influencing e.g. the radio functionality in the wireless device multiple types of attacks can be initiated. For example, it may be possible to activate the microphone, camera or other sensors in the wireless devices.

Due to the large number of wireless devices in the network these can be used jointly to do DNS type of attacks. Such an attack can be triggered in several ways, e.g. using a false base-station, fake system information, etc. But it can also be triggered on the application layer, for example, by in a coordinated fashion triggering update functions in applications to overload the system.

A compromised wireless device can also be made to misbehave by triggering other supported functions in the radio services. One type of such an attack that is known is that the wireless device can be triggered to start doing emergency PRACH by targeting the telephone application. This is not currently possible to prohibit, i.e. even if the radio functionality is not compromised, this behavior can be triggered. It has been proposed that it therefore should be possible to control this behaviour, e.g. by using global black listing of compromised wireless devices.

The problem with compromised wireless devices is that the device identity (IMEI) is not currently protected. This implies that a malicious device could be used to spoof the IMEI for other devices and thus get non-malicious and non-compromised devices black-listed. Hence there is a problem of using the IMEI for device control as an automatic network mechanism used to black-list devices. For example, getting all home alarm systems black-listed r all smartphones of a certain brand black-listed would create large problems for legitimate users.

One problem with the existing usage of International Mobile Equipment Identity (IMEI) is that there is no verification process for the identity. This implies that a malicious device can just "steal" the IMEI from any other nearby device. When blacklisting malicious devices, for instance, devices performing repeated emergency random access requests this can result in that "wrong devices", devices which are not performing repeated emergency random access requests but whose IMEI was stolen, are blacklisted. Furthermore, as the association between IMEI and device is not secure, also any association with the IMEI to any other properties of the device is insecure. Having a compromised device misbehaving in the network to get a legitimate, non-compromised device blacklisted is an attack in its own right. Furthermore, this can be the initial step in a multi-stage attack.

It is thus desirable to enable the reliable verification of a device, particularly of a wireless device identifier of a wireless device.

SUMMARY

Suitable methods, network node, wireless device, system and computer program are defined in the independent claims. Advantageous embodiments are defined in the dependent claims.

In one embodiment, a method carried out by a wireless device is provided to support verification of a wireless device identifier associated with the wireless device, wherein a cryptographic key is assigned to the wireless device. The method comprises the steps of transmitting the wireless device identifier and calculating verification information from a random bit sequence by using a verification function associated with the wireless device identifier. The verification function uses the cryptographic key. The method furthermore comprises the step of transmitting a message comprising the verification information to a trusted network node over a secure connection. The secure connection is established by using a trusted network identifier. Alternatively, the secure connection is established by using a network encryption key associated with a trusted network identifier. Accordingly, reliable verification of the wireless device identifier of a device can be performed. In particular, this allows that an accurate determination can be performed whether the wireless device identifier had been tampered with or not.

In one embodiment, a method is provided for verification of a wireless device identifier associated with a wireless device. The method may be performed by a network node forming a wireless communication system with the wireless device. The method comprises the steps of receiving a wireless device identifier and receiving from the wireless device over a secure connection a message comprising verification information. The method furthermore comprises determining whether the received wireless device identifier is the wireless device identifier associated with the wireless device based on the verification information and a cryptographic key. The secure connection is established by using a trusted network identifier. Alternatively the secure connection is established by using a network encryption key associated with a trusted network identifier. Accordingly, reliable verification of the wireless device identifier of a device can be performed. In particular, this allows that an accurate determination can be performed whether the wireless device identifier had been tampered with or not.

In one embodiment, a wireless device is provided to support verification of a wireless device identifier associated with the wireless device, wherein a cryptographic key is assigned to the wireless device. The wireless device is adapted to perform the steps of transmitting the wireless device identifier and calculating verification information from a random bit sequence by using a verification function associated with the wireless device identifier, wherein the verification function uses the cryptographic key. The wireless device is furthermore adapted to perform the further steps of transmitting a message comprising the verification information to a trusted network node over a secure connection, wherein the secure connection is established by using a trusted network identifier. Alternatively, the secure connection is established by using a network encryption key associated with a trusted network identifier. Accordingly, reliable verification of the wireless device identifier of a device can be performed. In particular, this allows that an accurate determination can be performed whether the wireless device identifier had been tampered with or not.

In one embodiment, a network node of a wireless communication system is provided to verify a wireless device identifier associated with a wireless device, wherein a cryptographic key is assigned to the wireless device. The network node is adapted to perform the steps of receiving a wireless device identifier and receiving from the wireless device over a secure connection a message comprising verification information. The network node is furthermore adapted to perform the further step of determining whether the received wireless device identifier is the wireless device identifier associated with the wireless device based on the verification information and a cryptographic key. The secure connection is established by using a trusted network identifier. Alternatively, the secure connection is established by using a network encryption key associated with a trusted network identifier. Accordingly, reliable verification of the wireless device identifier of a device can be performed. In particular, this allows that an accurate determination can be performed whether the wireless device identifier had been tampered with or not.

In another embodiment, a system is provided comprising the network node including its functional elements as well as the wireless device including its functional elements.

In another embodiment, a computer program is provided which includes instructions configured, when executed on a processor, to cause the processor to carry out the above-described methods.

Further, advantageous embodiments of the invention are disclosed in the dependent claims.

DESCRIPTION OF THE EMBODIMENTS

Further embodiments of the invention are described with reference to the figures. It is noted that the following description contains examples only and should not be construed as limiting the invention.

In the following, similar or same reference signs indicate similar or same elements or operations.

Figure 1:
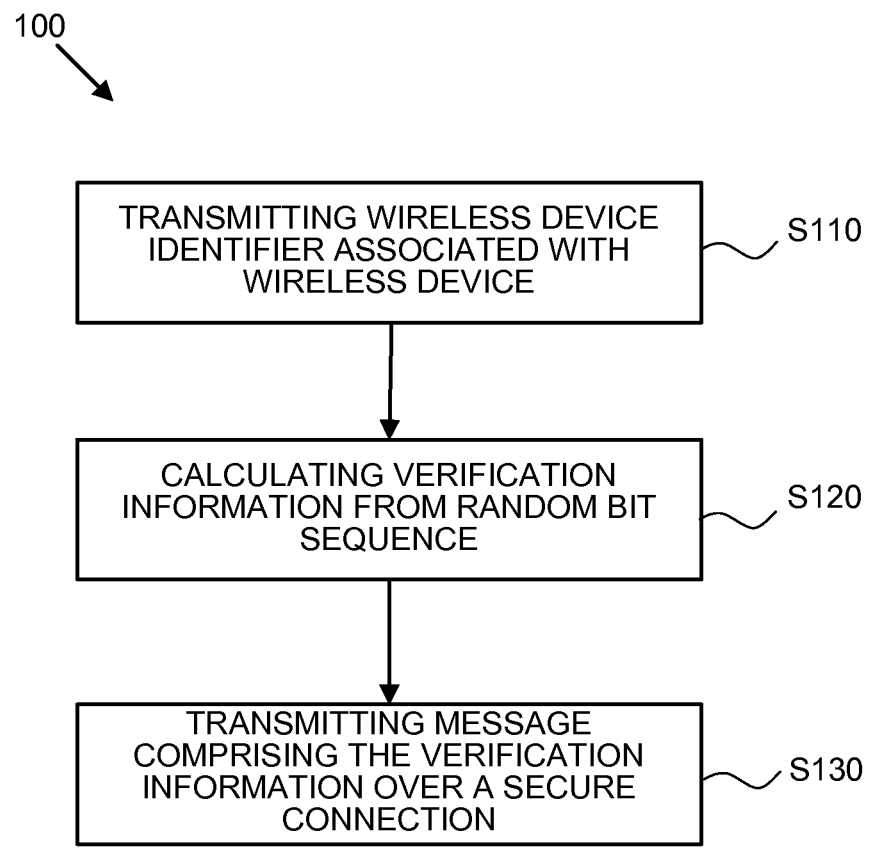
FIG. 1 illustrates a flowchart of operations of a method in a wireless node for supporting verification of a device according to an embodiment.

FIG. 1 illustrates a flowchart of operations of a method in a wireless node for supporting verification of a device according to an embodiment.

The operations, also referred to as steps in the following, of the method may be carried out by a wireless device of the wireless communication system, e.g. a UE or IoT device. For example, the functions described in FIG. 1 can also constitute functional elements in a device, which will be discussed with respect to FIG. 7 later. In the reference signs of the flowcharts, step is indicated as "S" followed by the step number.

The wireless device described herein may be any type of terminal like a user equipment, mobile phone or other kind of terminal, e.g. smartphone, tablet computer, laptop, Personal Digital Assistant (PDA), wearables, etc. Most notably, the wireless device is not limited thereto and may be any wirelessly controllable, intelligent device, including modern kitchen appliances, indoor climate control devices, home entertainment equipment, etc., which can be connected to a wireless network, like in the internet of things.

As can be seen in FIG. 1, the method 100 comprises three steps 110, 120 and 130 carried out in/by a wireless device of a wireless communication system to support verification of a device, in particular, the identity of a device or the verification of an identifier of the wireless device. The wireless communication system is preferably a system of network nodes and wireless devices which connect to certain network nodes forming nodes of a radio access network (RAN).

In detail, the method comprises step 110 at which a wireless device identifier associated with a wireless device is transmitted from a wireless device. The wireless device identifier may be transmitted using an uplink channel. The wireless device identifier may be transmitted to a network node or a trusted network node. The wireless device identifier may be transmitted after the wireless device received a message from either a network node or a trusted network node indicating a network identity.

The wireless device identifier may be any number, string of bits, string of numbers, letters and special characters used to identify a wireless device in a wireless communication system. More specifically, the device identifier may be unique for a single wireless device. In other words, each wireless device is assigned one wireless device identifier. Even more specifically, the wireless device identifier may be an international mobile equipment identity, IMEI. The person skilled in the art realizes that these techniques discussed herein can also be applied to the case of non-wireless communication system.

Figure 4:
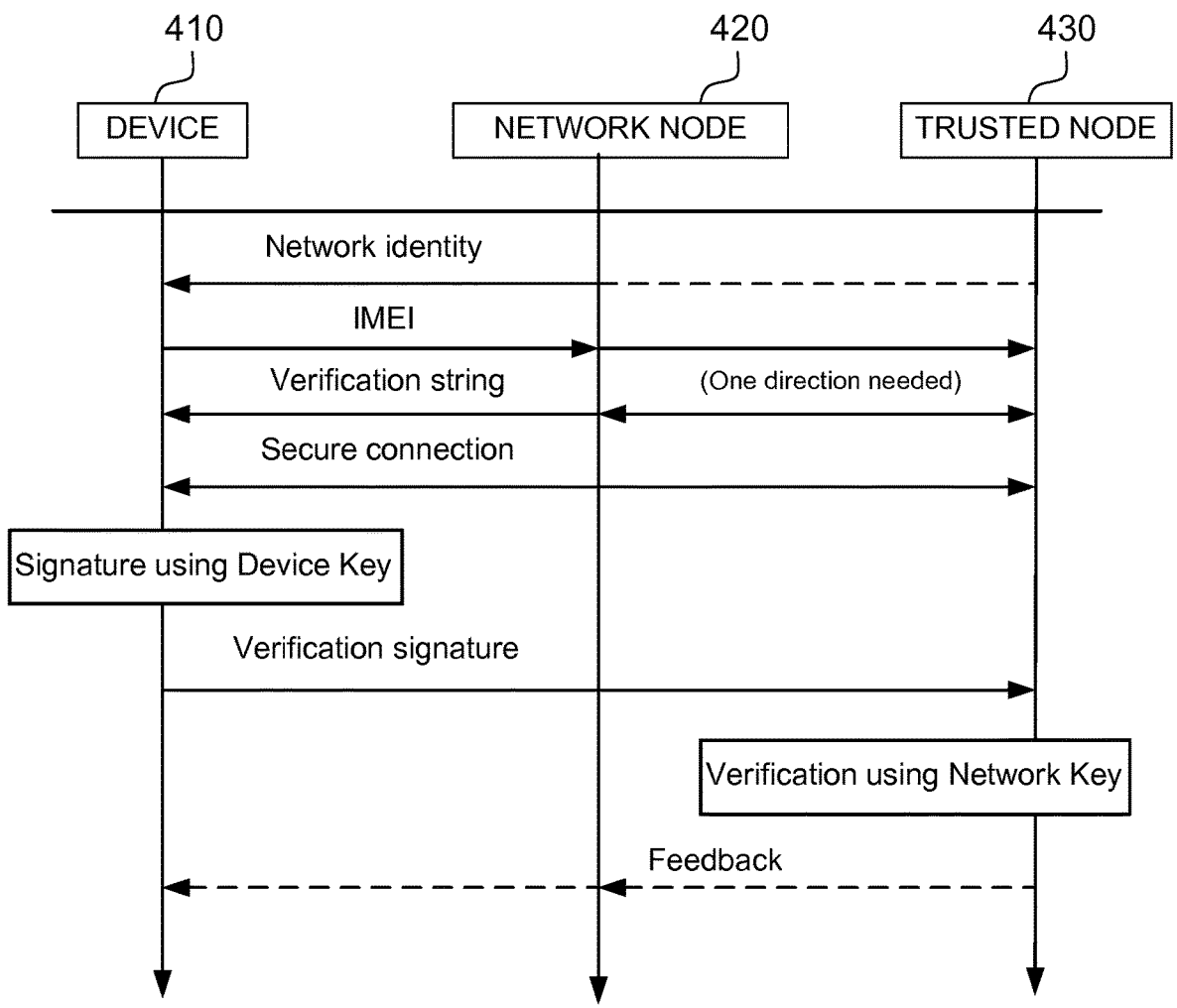
FIG. 4 illustrates signaling in a communication scheme between a network node and wireless device in a wireless communication system according to an embodiment.
Figure 5:
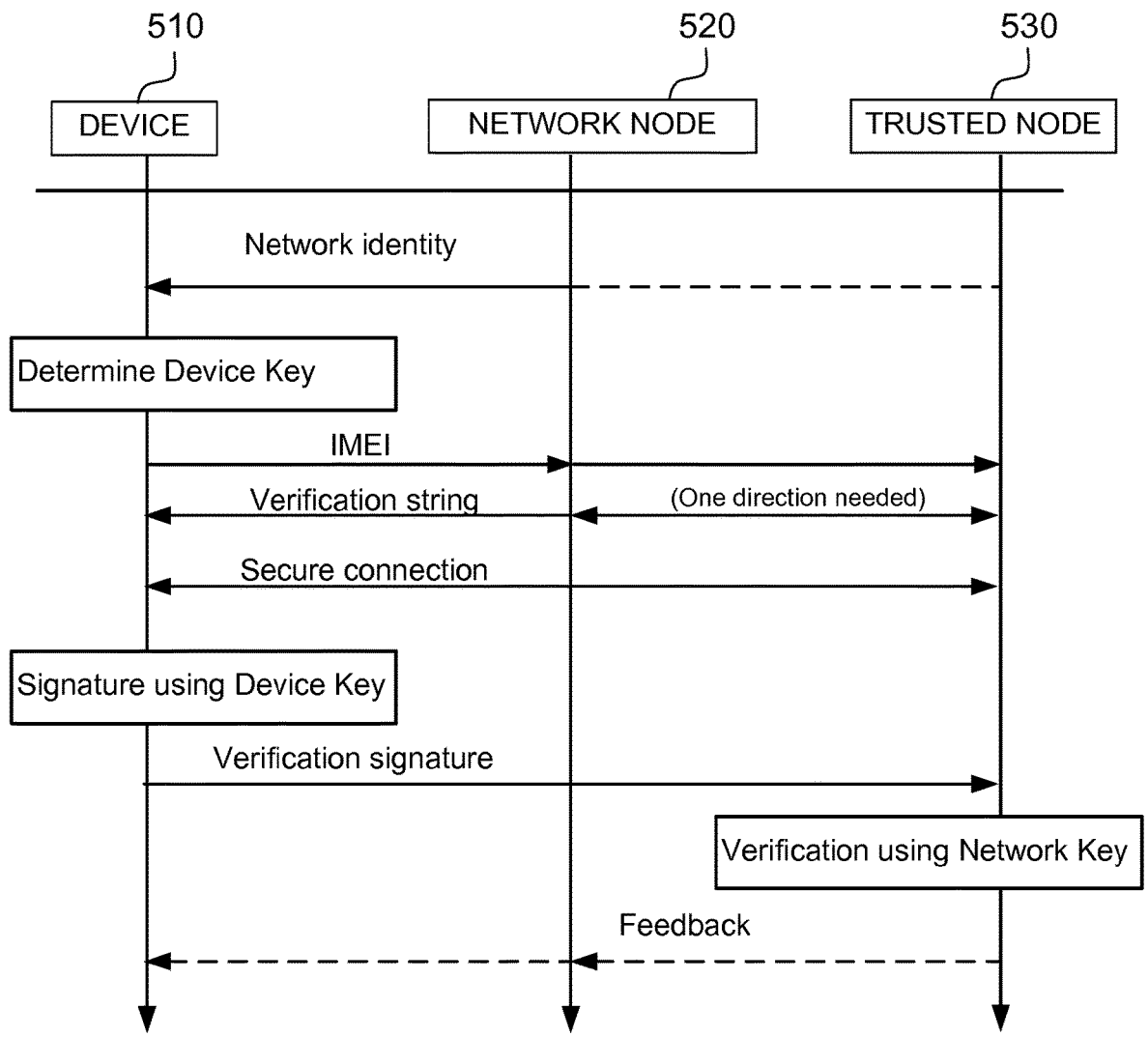
FIG. 5 illustrates signaling in another communication scheme between a network node and wireless device in a wireless communication system according to an embodiment.
Figure 6:
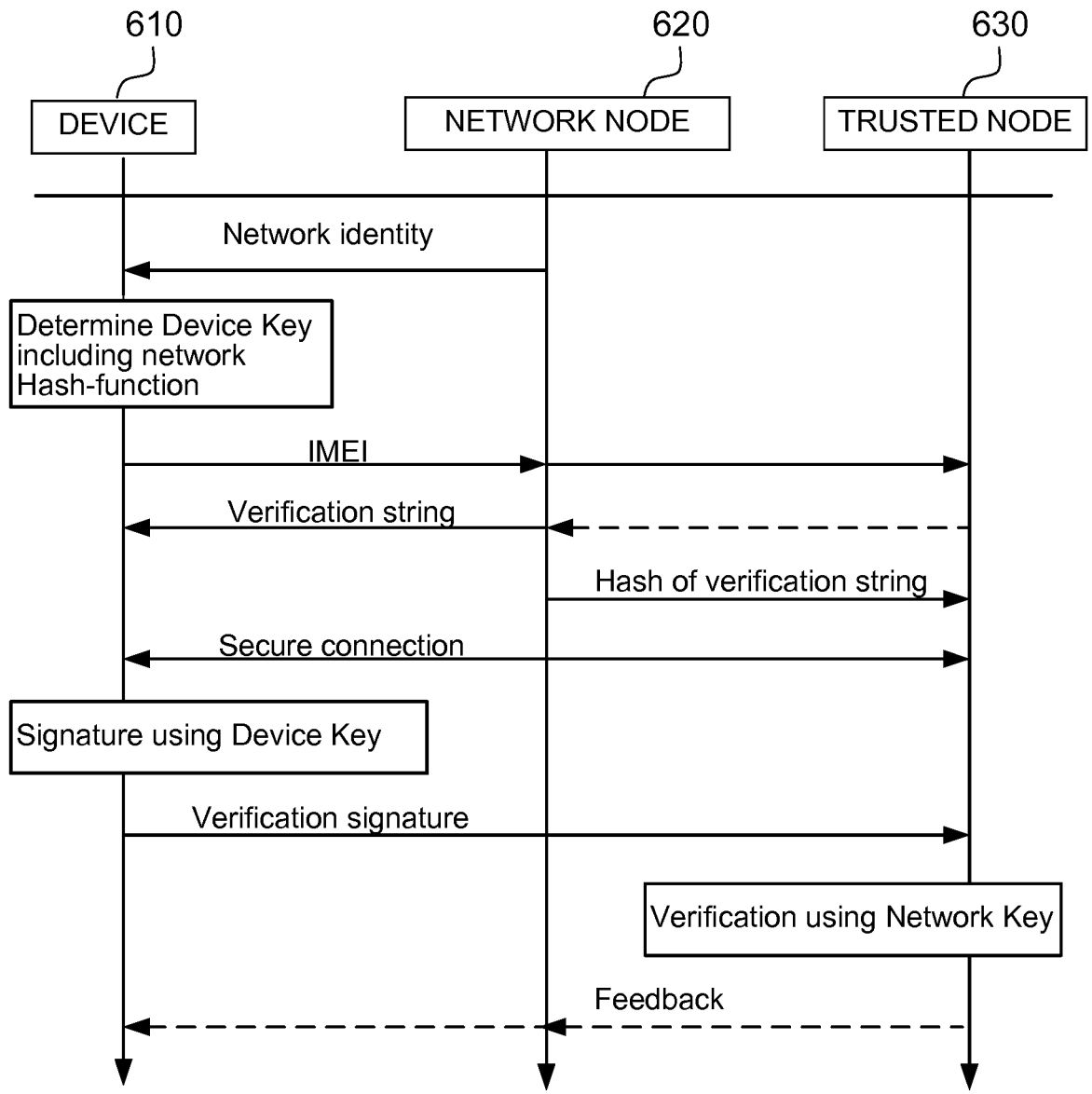
FIG. 6 illustrates signaling in another communication scheme between a network node and wireless device in a wireless communication system according to an embodiment.

FIGS. 4, 5 and 6 illustrate various ways on how this step and following steps fit into the overall flow of messages transmitted according to embodiments. The embodiments of FIGS. 4, 5 and 6 depict step 110 as an IMEI being transmitted from the device 410 to a network node 420 and/or a trusted network node 430.

A network node may be a base station commonly used in wireless telecommunication systems, used in the communication standard 5G or in other subsequent relevant telecommunication techniques and standards. Moreover, the network node may be any unit, means, configuration of means or physical entity which allows for receiving and/or transmission of electromagnetic waves or signals that are carrying information and data. Moreover, the network node receiving/transmitting information over the RAN may be connected to another network node for carrying other telecommunication operations, and particularly, the below mentioned determining step 230. Network node may furthermore process and/or manipulate the received data and work with the (processed) data.

The trusted network node may be configured to perform the same operations as the network node described above. Beyond that the trusted network node has the property of being "trusted". That is, when transmitting data to a trusted network node it can be assured (to a certain degree of certainty) that the trusted network node is not compromised, is not a fake base station, has not been tampered with, etc. In other words, it can be taken as a given that the trusted network node does not hand over the received verification signature (verification information) to a fake wireless device. In case the verification information is intercepted by a fake base station, the fake wireless device then may maliciously use the intercepted verification information when trying to fake the wireless device identifier of the wireless device the wireless device identifier was originally assigned to. Moreover, the trusted network node may be specifically designed to establish a secure wireless connection to a wireless device, either applying commonly known techniques or techniques specifically designed for the purpose of transmission of the verification information described above and below.

Figure 3:
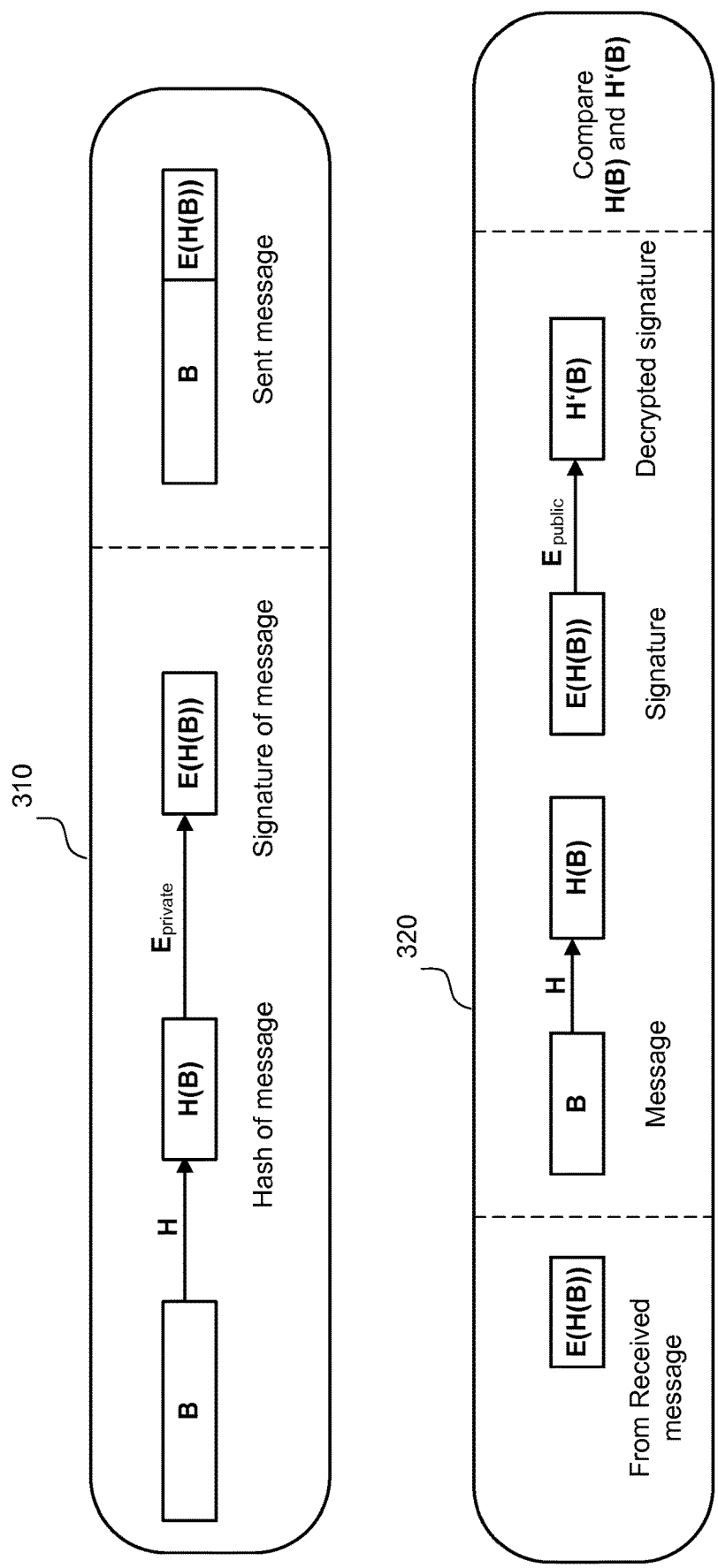
FIG. 3 explains the concept of deriving a verification signature from a message.

At step 120 the wireless device then calculates verification information from a random bit sequence by using a verification function associated with the wireless device identifier. The verification function uses a cryptographic key. FIG. 3 discussed below illustrates the various possible steps to be performed when calculating the verification information.

It is noted that the random bit sequence may be either received from a trusted network node, or the random bit sequence may be generated at the wireless device and transmitted to a trusted network node.

The random bit sequence may be referred to as verification string, random bit string, or random bit information, and may be used when verifying a wireless device identifier as described below. As an example, the random bit sequence may be a randomly generated sequence of bits, such as "0001010101111001" either generated by commonly known (pseudo-) random number generators or specifically designed methods. The methods, routines or algorithms used when generating the random bit sequence may depend on the devices used in the wireless communication network, such as the wireless device or the specific network nodes forming the wireless network.

Specifically, as one way of calculating the verification information, the wireless device encrypts the random bit sequence by using the cryptographic key and an encryption function of the verification function. Common encryption functions may be used when encrypting the random bit sequence. Furthermore, specifically designed encryption functions may be used when encrypting the random bit sequence.

Alternatively, as another example of calculating the verification information, the wireless device may obtain a hashed random bit sequence by hashing the random bit sequence by using a hash function. This hashed random bit sequence may then be encrypted by using the cryptographic key and an encryption function of the verification function. In another embodiment, calculating the verification information may be carried out using the hash function only. The used hash function should be the same in the wireless device and the network node.

An example of hashing data, for instance a random bit sequence, is discussed in process 310 of FIG. 3. Hashing the random bit sequence allows for reducing the length of the random bit sequence. Thus, the data to be transmitted, e.g. the length of the messages to be sent, is reduced. Moreover, a secret hash-function may be used which is shared by the wireless device and the network node. The hash-function may be uniquely assigned to the wireless device. Thus, it is possible to verify the identity of the wireless device at the network node by comparing the hashed random bit sequences generated at a network node and the wireless device assigned the hash-function. The encrypted hashed random bit sequence is then the verification information. An example of encrypting hashed data, such as data in message B, for instance a hashed random bit sequence, is discussed in FIG. 3. The key used when encrypting the hashed random bit sequence may be a private or a public key, thus increasing the security when performing verification of the identifier of the wireless device.

The verification information may be referred to as verification signature, signature, calculated verification signature, signature of a message in the embodiments herein.

At step 130, a message is then transmitted from the wireless device to a trusted network node over a secure connection, the message comprising the verification information. The message may be transmitted using an uplink channel. The message comprising the verification information may be referred to as verification message.

The secure connection is established by using a trusted network identifier or by using a network encryption key associated with a trusted network identifier. The trusted network identifier is usually known to the wireless device and the trusted network node. Common routines for establishing secure connections may be used when establishing the secure connection. Furthermore, routines or algorithms specifically designed for this purpose may be used as well.

The trusted network identifier may be an indicator indicating a network associated with SIM-card or stored in the SIM-card used by the wireless device. The trusted network identifier may be any kind of data structure or information which may be used to establish a secure connection between a wireless device and a network node and accordingly a trusted network node. The trusted network identifier may be stored in the wireless device in a corresponding storage medium. Furthermore, the trusted network identifier may be signalled or transmitted to the wireless device, e.g. from a trusted network node using either commonly known wireless transmission techniques or specifically designed techniques for transmission of the trusted network identifier. As specific example the (trusted) network identifier may the PLMN Id (public land mobile network identifier). The network encryption key may be a cryptographic key, a private key, a public key, a key used when encrypting data, communications, or wireless communications, etc.

Forwarding the verification information to the trusted network node through a secured connection allows verification of the device identity using the verification information at the trusted network node. In particular, as explained with respect to FIG. 4 later, using the secure connection between a trusted network node and the wireless device when transmitting the message comprising the verification information as in step 130 allows for circumventing malicious fake base stations. These fake base stations may intercept and retransmit the verification information to other, possibly malicious, wireless devices which may be used in attacking the wireless communication network. This procedure is sometimes referred to as a "man in the middle attack". Thus, this attack is pre-emptively circumvented. Thereby, the security of the verification of the wireless device identifier is increased.

The security of the above described method may be further increased by sending the verification message only in encrypted form, using public and/or private keys, never disclosed keys assigned to the wireless device and/or the network node. This is, by assigning a secret private key to each wireless device identifier, e.g. the IMEI, the reliability and security can be increased. It is noted that this key or any signature of the key may not be disclosed in a non-secure manner, e.g. by using a secure connection between wireless device and network node.

Applying the above, the message comprising the verification information (verification message) is only disclosed to a trusted network node of a trusted network and thus the security of the verification of the wireless device identifier is increased.

Ultimately, the wireless device identifier, such as an IMEI, can be verified for a device. Thus, black-listing etc. can be tied to a specific IMEI without the above named problems usually occurring when black-listing based on non-verified wireless device identifiers (IMEIs). Also, if the wireless device identifier is tied to a specific category of wireless devices, such as a security category, IOT-device-category, etc., the verification process can also verify that the wireless device has the device capabilities that it claims to have.

Figure 2:
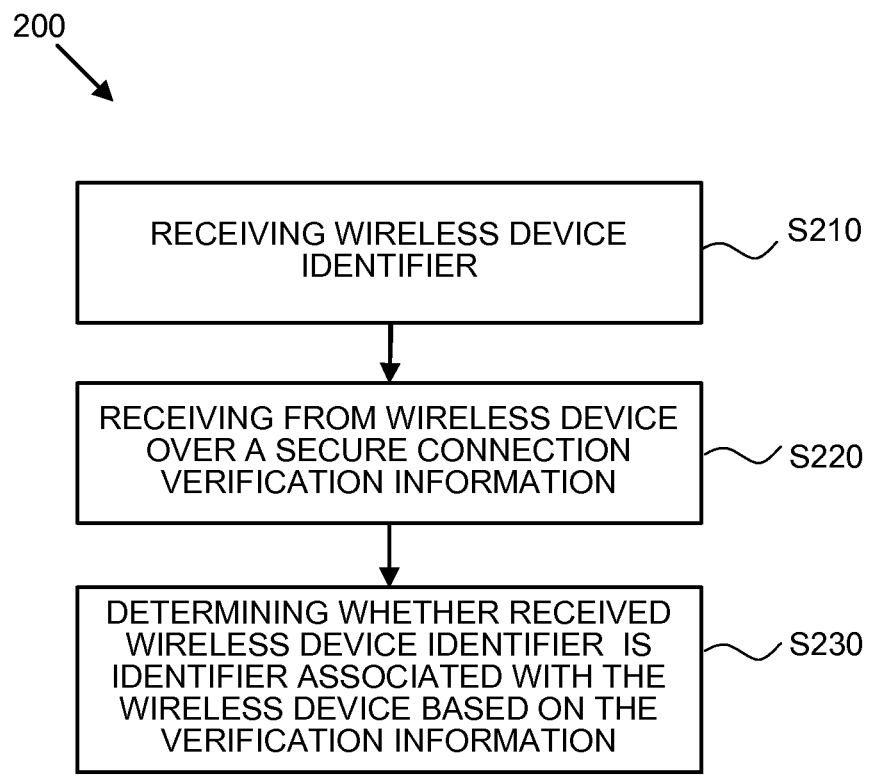
FIG. 2 illustrates operations of a method in a network node for verification of a device according to an embodiment.

FIG. 2 illustrates a flowchart of a method 200 for verification of a wireless device identifier of a wireless device. The method 200 comprises three steps 210, 220 and 230 carried out by a wireless communication system to support verification of a wireless device identifier of a wireless device. Preferably, the method is carried out by at least one network node of the network nodes forming the wireless communication system, but may also be carried out by two or more network nodes. Most notably, the steps may be performed by a trusted network node which may be defined in the manner described above.

In detail, the method 200 comprises the step 210 where a (trusted) network node receives a wireless device identifier. The wireless device identifier may be the same wireless device identifier discussed in the above method 100. The wireless identifier may be received using an uplink channel. The wireless device identifier may be received from wireless device. The wireless device identifier may be received after a network node (possibly different from the network node receiving the device identifier) transmitted a message indicating a network identity to the wireless device.

As mentioned above, the wireless device calculates the verification information (verification signature) which is (later) received at step 220 by the network node from the wireless device in a message, which may be an uplink message, transmitted over a secure connection. Details about the secure connection are discussed above. The trusted network identifier is usually known to the wireless device and the trusted network node. FIG. 3 provides further information on how the verification information is calculated at the wireless device.

At step 230, it is determined whether the received wireless device identifier, e.g. the IMEI, is the wireless device identifier associated with the wireless device, e.g. user equipment such as a smartphone. This determination is based on the received verification information and a cryptographic key. In other words, the (trusted) network node verifies the wireless device identifier of the wireless device. FIG. 3 below provides further information on how the determination is performed at the network node.

In an embodiment, the network node obtains decrypted verification information by decrypting the verification information by using a decryption function and the cryptographic key. Based on this, the trusted network node then determines that the received wireless device identifier, e.g. the IMEI as described above, is the wireless device identifier associated with the wireless device if the decrypted verification information and the random bit sequence match.

Alternatively thereto, the network node may obtain a hashed random bit sequence by hashing the random bit sequence by using a hash function. The trusted network node then determines that the received wireless device identifier, e.g. the IMEI, is the wireless device identifier associated with the wireless device if the decrypted verification information and the hashed random bit sequence match.

In an alternative embodiment, the network node determines that the received wireless device identifier is the wireless device identifier associated with the wireless device if expected verification information and the received verification information match. An expected verification information may be obtained by using a verification function that uses the random bit sequence and the cryptographic key.

In general, the expected verification information may be any type data or information that is used when verifying the wireless device identifier in the manner described herein. In particular, the expected verification information may be calculated at the trusted network node. The expected verification information may be calculated at the trusted network node after receiving messages carrying information needed to calculate the expected verification information from the wireless device. For instance, the expected verification information may be calculated (derived, obtained, generated) by hashing the described random bit sequence. Another example may be calculating the expected verification information by using a verification function that uses the random bit sequence and the cryptographic key. For instance, the trusted network node may use a specifically designed function or method which transforms the random bit sequence into another sequence of bits using depending on specific properties of the cryptographic key in use. Likewise the random bit sequence, or parts of the random bit sequence, may be used as a seed determining the initial properties of the verification function which produces an output which then may be further transformed based on the cryptographic key. The expected verification information may have properties, such as data-structure, size, format, etc. similar to the verification information discussed throughout above and below embodiments.

It is noted that the hash function comprised in the verification function of the network node may be the same hash function as comprised in the verification function of the wireless device. Hence, if only the same hash function and no encryption is used, the verification function used when calculating the comparison signature (verification information) can be the same verification function used in the wireless device. This allows for reduced computational effort, simplified circuitry and faster verification when verifying the wireless device identifier.

In both of the above methods the wireless device identifier is associated with a wireless device. Specific examples and further details in the peculiar properties of the wireless device identifier are provided above when discussing FIG. 1.

The skilled person understands that the various keys referred to above that are used when establishing a secure connection and/or encrypting the (hashed) random bit sequence and/or decrypting the verification information may be chosen among any of private keys, public keys, or any other form of data or information designed for the purpose of establishing secure connections, encrypting and decrypting data. Specific examples of configurations relying on the distribution of private keys and public keys among the wireless device and the (trusted) network nodes of a wireless communication system are discussed below.

In other words, the above methods allow adding a verification process for the IMEI based on a verification signature. The verification signature is only disclosed over a secure connection with a trusted network node. The methods can be further extended and given additional flexibility if the verification process uses a private wireless device key and a public network key for the (trusted) network nodes of the wireless communication system. This allows for protection against insecurities on the network side as for instance occur in the case where a wireless device is deployed in a public communication network where it is expected that the network key may be captured by an adversary network node.

As can be seen from FIG. 3, a possible way of deriving a verification signature E(H(B)) from data, such as a message B including preferably at least the random bit sequence, at the wireless device, is shown in the upper part 310 of FIG. 3. Furthermore, a possible way of verifying this verification signature at a network node in the wireless communication system is shown in the lower part 320 of FIG. 3.

When deriving the verification signature from message B the random bit sequence as discussed in the above methods of FIGS. 1 and 2 may be used as message B.

Message B or its content may also be named verification string. The wireless device first calculates a hash value from message B, H(B), using a hash function. For this, either a commonly known hash function or a specifically designed hash function is used. In other words, the verification function comprises a hash function, and the step of calculating the verification signature comprises hashing at least the random bit sequence using the hash function.

Subsequently, the wireless device encrypts the hash value using either a commonly known encryption function or a specifically designed encryption function together with an encryption key, a key, a private key, a public key or any other piece information suitable for encrypting the hashed random bit sequence. In the example of FIG. 3, a private key is used. The thus obtained encrypted hash value, or encrypted hashed random bit sequence, may be also termed the verification signature or signature of the message. In other words, the verification function further comprises an encryption function, and the step of calculating the verification signature further comprises the step of encrypting at least the hashed random bit sequence using a key, such as the private key.

The process 320 of FIG. 3 may be used for verifying the signature at a network node. It is noted that the network node is preferably the above discussed trusted network node.

At first, the network node receives the verification signature E(H(B)) obtained in process 310 and transmitted from the wireless device. In more detail, this procedure comprises a step of receiving a verification signature from the wireless device in an uplink message.

Moreover, the network node calculates a hash value from a message using a hash function. The message may be a random bit sequence in message B. In other words, the network node calculates a comparison signature from the random bit sequence using a network node verification function which may be assigned to the wireless device identifier, e.g. the IMEI. More specifically, the network node verification function may comprise a hash function, and calculating the comparison signature may comprise hashing at least the random bit sequence using the hash function. In this respect, in the context of calculating the comparison signature, the verification function may also be referred to as a comparison signature generation function, comparison generation function, signature generation function or similar. The message may be the same message B as used when deriving the verification signature from message B as described in process 310 above. The hash function may be the same hash function used when deriving the verification signature from message B as described in process 310 above.

The verification function in process 320 may further comprise a decryption function for decrypting the received verification signature. Then, the wireless device identifier can be verified, i.e. it can be verified that the wireless device identifier is associated with the wireless device transmitting the verification signature (verification information), if the calculated comparison signature matches the decrypted verification signature.

In more detail, the network node decrypts the verification signature E(H(B)) using a key. The key may be referred to as a cryptographic key, decryption key, encryption key, a private key, a public key or any other piece information suitable for decrypting the verification signature. In the example of FIG. 3, a public key is used, which forms a key pair together with the private key used in process 310. Thereby, the network node calculates the decrypted verification signature H'(B) in process 320.

Alternatively, a private key may be used in process 320 and a public key may be used in process 310. In general, the keys may form a key pair together, allowing for increased security when verifying the wireless device identifier associated with the wireless device.

In the following, the network node compares the comparison signature to the decrypted verification signature. If the comparison signature and the decrypted signature match, the network node determines that the received wireless device identifier is the wireless device identifier associated with the wireless device.

A specific example regarding encryption has been discussed above. Encryption is possible to do either using a shared secret, i.e. both transmitter and receiver know something that enables these to encrypt/decrypt or using a private key and a public key where the private key is kept secret while the public one can be distributed to a group of users, similar to FIG. 3. Private and public key methods can be used both to enable the owner of the private key to encrypt messages that then can be decrypted by anyone in possession of the public key. It can also be used to enable anyone in possession of the public key to encrypt messages that can only be read by the one in possession of the private key.

Using signatures is a method, as defined herein, to use a combination of the public/private key encryption and a shared (possibly secret) hash function.

Alternatively, instead of hashing with a hash function a check-sum scheme may be used for calculating a fixed length data string similar to the hashed random bit sequence. That is, any function having similar properties as hashing or check-sum functions may be used when obtaining the fixed length data string.

FIG. 4 illustrates a possible sequence of messages transmitted between the wireless device (device) 410, (arbitrary) network node 420 and a trusted network node (trusted node) 430.

In general, one of the network nodes forming the wireless communication network may transmit a message in the downlink to the wireless device 410. This message may include an indicator indicating the network identity to the wireless device. This indicator may also be referred to as a trusted network identifier as mostly (but not necessarily) done in the above and below.

The wireless device then transmits a message containing the wireless device identifier, e.g. the IMEI, to the (trusted) network node using an uplink message. After having received the wireless device identifier, the (trusted) network node transmits a verification string, e.g. a random bit sequence as described above, to the wireless device using a downlink message. This downlink may additionally include a trusted network identifier which is transmitted from the trusted network node to the wireless device. In other words, the trusted network node transmits the random bit sequence (the verification string) and a trusted network identifier to the wireless device. Then, the wireless device receives the random bit sequence and the trusted network identifier from the trusted network node. After that a secure connection is established between the wireless device 410 and the trusted network node 430. Then the wireless device calculates the verification information (signature) from the random bit sequence (verification string) received earlier from the (trusted) network node.

FIG. 3, described above, illustrates examples how the verification information may be calculated (derived, obtained) from the received verification string. It is noted that the wireless device may calculate the verification information using a device key. The device key may be also referred to as a cryptographic key. Furthermore, the device key may be a private key or a public key in terms of cryptography. Furthermore, the device key may be a key forming a pair (corresponding to) a network key. The network key is used by the (trusted) network node when verifying the wireless device identifier. The network is described further below. After having calculated the verification information, the wireless device transmits the verification information to the trusted network node by using an uplink message transmitted through the secure connection. Having received the verification information, the trusted network node verifies the wireless device identifier, e.g. the IMEI. The verification may be carried out as described above and illustrated in FIG. 3. It is noted that the trusted network node uses a network key when verifying the wireless device identifier. The network key may be also referred to as a cryptographic key. Moreover the network key may correspond to (form a cryptographic pair) with the device key, as also described above. Furthermore, the network key may be a private key or a public key in terms of cryptography.

It is noted that the skilled person is well aware that transmissions of pieces of information, such as the wireless device identifier, between network node, trusted network node and wireless device may be interchanged, postponed with respect to other operations or left out depending on the technical circumstances. For instance, the above sequence of transmissions may be altered in that the transmission of the network identity is not performed due to technical circumstances such as the wireless device being assigned a specific network identity during manufacturing. As another example, the secure connection may be established before the wireless device receives the verification string (random bit sequence), based on information included in the message carrying the network identity. Or the secure connection may be established after calculating the signature (verification information) but prior to transmission of the signature to the trusted network node.

According to an embodiment, the above described verification process is performed by first assigning a private key, this is a cryptographic key which is a private key assigned to the wireless device (mobile device), where a wireless device identifier, IMEI, is also associated with the wireless device. Furthermore, the network key (another cryptographic key), which in this case is a public key, is distributed to a trusted network node. The trusted network node may remember the key if the same trusted network node is used for two purposes, such as issuing the cryptographic key to a wireless device and verifying the wireless device identifier, e.g. the IMEI. The trusted network node may additionally be defined by a subscription identity of the wireless device, e.g. the SIM-card that the wireless device uses. Following this, the trusted network node transmits a sufficiently long (random) verification-string, this is a random bit sequence as described above, to the wireless device using by downlink message.

The wireless device then calculates the verification signature (verification information, signature) for said verification string (random bit sequence) by applying the methods described above and for instance illustrated by FIG. 3, using said private device key as cryptographic key. In an example, the device key can be partly determined using the subscription identity of the wireless device. Following this, a secure network connection is initiated using the trusted network identifier. Then, the wireless device identifier, e.g. the IMEI, is validated, this is the IMEI is verified. This may be done by transmitting the verification information over a secure connection to the trusted network node. The trusted network node uses the calculated verification information (verification signature, signature) and the public key.

In a specific example of the embodiment, the message including the random bit sequence also includes a request for the wireless device to transmit the wireless device identifier, e.g. the IMEI. Moreover, this message may include a trusted network identifier. For instance, the message illustrated in FIG. 4 which transmits the network identity from network node to wireless device include the request of transmission of the wireless device identifier, include a trusted network identifier, which may be used when establishing the secure connection between trusted network node and wireless device, and include the verification string (random bit sequence) to be used when authenticating (verifying) the wireless device identifier. Thus, the signalling amount needed when verifying the wireless device identifier is reduced. Moreover, the trusted network identifier enables security in that an adversary device, e.g. a malicious, fake network node, cannot request valid verification information (verification signature, signature) from a wireless device applying the described methods.

In another example the trusted network identifier is the network associated with the SIM-card used by the wireless device. In another example the (trusted) network identifier is the PLMN Id (public land mobile network identifier).

According to another embodiment, verification of the wireless device identifier is performed by assigning a cryptographic key to the wireless device (mobile device) with an associated wireless device identifier, e.g. an associated IMEI. The cryptographic key assigned to the wireless device and the wireless device identifier are then distributed (transmitted) to a trusted network node, e.g. the Equipment Identity Register (EIR) in LTE or the 5G-EIR in 5G. The wireless device, e.g. user equipment, UE, sends the wireless device identifier, e.g. the IMEI, to the trusted network node, e.g. the EIR. Alternatively, the trusted network node, e.g. the EIR, retrieves the wireless device identifier from the wireless device.

The trusted network node generates a (pseudo) random number (RAND), such as a random bit sequence, and uses that along with the cryptographic key associated to the wireless device and a previously agreed authentication algorithm to calculate an expected result, XRES. In other words, the expected result is expected verification information as described above. Then, the random bit sequence is sent to the wireless device. The wireless device uses the random bit sequence, the assigned cryptographic key and the agreed authentication algorithm to calculate a result RES. The wireless device then sends the calculated result RES to the trusted network node. In other words, the calculated result is the verification information transmitted from the wireless device to the network node, as described above. The trusted network node then validates the wireless device, e.g. it verifies the wireless device identifier similar to the manner described above, by comparing the calculated expected result, XRES, with the result received from the wireless device, RES. If the expected result (expected verification information) and the calculated result (verification information) match, the IMEI (wireless device identifier) received from the wireless device is considered to be authentic (it is verified).

These transmissions and operations are, for example, performed after authentication of the network by the wireless device. Accordingly, this allows protecting against third parties faking the verification, e.g. by using fake base stations performing "man-in-the-middle" attacks in the manner described above. Note also that the actual calculation of the calculated results, RES, may be performed at devices or elsewhere in the wireless device as long as there is trusted and secure communication between the devices and e.g. the application layer in the wireless device. This requires that the necessary information, such as the random bit sequence, the cryptographic key and the agreed authentication algorithm which are needed to perform the calculation are available to the wireless device, e.g. the application layer of the wireless device.

The skilled person is well aware that the sequence of transmission and operations named in this embodiment do not exclude possible alterations, such as interchanging several transmission with operations or transmissions described in this embodiment.

In yet another embodiment, similar steps as in the previous embodiment described above are performed with some changes. In this embodiment, the wireless device for each request to send the wireless device identifier to the network generates a random number, such as the random bit sequence, and uses this along with a cryptographic key associated to the wireless device identifier and an agreed authentication algorithm to calculate a result RES. Following this, the wireless device transmits the wireless device identifier (IMEI), random bit sequence (RAND) and calculated result (RES) to the trusted network node (EIR). The trusted network node uses the received random bit sequence along with the cryptographic key associated to the wireless device identifier and the agreed authentication algorithm to calculate an expected result (XRES). Following this, the trusted network node uses the received random bit sequence along with the cryptographic key associated to the wireless device identifier and an agreed authentication algorithm to calculate an expected result (XRES). After having received the calculated result (RES) and having calculated the expected result (XRES), the trusted network verifies the wireless device identifier in the manner as described in the previous embodiment described above.

The transmissions and operations of this embodiment are, for example, performed after authentication of the network by the wireless device. Accordingly, it is possible to protect the wireless communication system against a third party faking the verification of the wireless device identifier.

Additionally, in order to prevent a possible replay of the receiving network node, this is the trusted network node, e.g. the EIR used in 5G, may keep track of the random numbers, random bit sequence, verification strings that were already used. The trusted network node may then, if it receives a random number that already has been used, either abort the verification (authentication) of the wireless device identifier (IMEI) or trigger another above described authentication procedure.

It is furthermore noted that the trusted network node may transmit a message to the wireless device providing feedback regarding the verification of the wireless device identifier, as for instance depicted by the dotted lines in FIG. 4. Feedback to the wireless device may also be provided by other means, e.g. by transmitting the feedback through other network nodes of the communication system, higher layer signalling, etc.

In some embodiments the device identity is paired with a subscription identity, either prior or after device verification.

Moreover, the described methods can be used to protect other device identities different from conventional IMEIs as long as these identities are device specific.

Furthermore, the trusted network identifier can be used when establishing the connection for a serving network. Moreover, initiating a secure connection can involve a second cryptographic key, key, function, method etc. not mentioned explicitly.

FIG. 5 illustrates a further possible sequence of messages exchanged between the wireless device (device) 510, (arbitrary) network node 520 and a trusted network node (trusted node) 530.

First the network identity may be transmitted from any network node to the wireless device as described above when describing FIG. 4. In addition to the sequence discussed in FIG. 4, the wireless device may then determine the device key, also referred to as cryptographic key. The device key may be determined based in information, data, indicators, etc. included in the message transmitted from the network node to the wireless device carrying indicating the network identity. After that, the wireless device may transmit the wireless device identifier to any of the network nodes as described above when describing FIG. 4. After that, the wireless device may receive the verification string (random bit sequence) from any of the network nodes as described above when describing FIG. 4. After that, as shown in FIG. 5, a secure connection is established between the wireless device and the trusted network node, as described above when describing FIG. 4. Following this, the wireless node may calculate the signature (verification information, verification signature) using the device key as described above when describing FIG. 4. Then the verification signature is transmitted from the wireless device to the trusted network node as described above when describing FIG. 4. After that the trusted network node may verify the wireless device identifier using the network key, respectively cryptographic key, as described above when describing FIG. 4. Then, the trusted network may signal or transmit feedback to the wireless device as discussed above when describing FIG. 4.

FIG. 6 illustrates a further possible sequence of messages exchanged between the wireless device (device) 610, network node 620 (arbitrary node, e.g. non-trusted network node) and a trusted network node 630 (trusted node). First, the network identity may be transmitted from any network node to the wireless device as described above when describing FIG. 4. In addition to the sequence discussed in FIG. 4, the wireless device may then determine the device key, also referred to as cryptographic key, and a network hash function. The device key may be determined based on information, data, indicators, etc. included in the message transmitted from the network node to the wireless device carrying indicating the network identity. The network hash function may be the hash function used by a network node when verifying the wireless device identifier as described above when describing FIG. 3 or 4. After that, the wireless device may transmit the wireless device identifier to any of the network nodes as described above when describing FIG. 4.

Then, the wireless device may receive the verification string (random bit sequence) from any of the network nodes as described above when describing FIG. 4. After that the network node 620 transmits a hash of the verification string (random bit sequence) that was previously transmitted to the wireless device to the trusted network node. For example, the network node 620 may calculate the hash of the verification string (hashed random bit sequence) by using a corresponding hash function to the network hash function determined by the wireless device 610 or the same hash function as the network hash function determined by the wireless device 610. After that, a secure connection may be established between the wireless device and the trusted network node, as described above when describing FIG. 4. Following this, the wireless node may calculate the signature, verification information, verification signature, using the device key as described above when describing FIG. 4. Then the verification signature is transmitted from the wireless device to the trusted network node as described above when describing FIG. 4. After that the trusted network node may verify the wireless device identifier using the network key, respectively cryptographic key and the hash of the verification string received previously from the network node 620. Specifically, the verification of the wireless device identifier may be carried out by any of the methods discussed when describing FIGS. 3 and 4 above. Then, the trusted network may signal or transmit feedback to the wireless device as discussed above when describing FIG. 4.

Furthermore, there are described various examples, embodiments and further steps to be applied when blacklisting wireless devices.

Specifically, the acquired secure identifier by the above methods, e.g. the wireless device identifier verified by one of the above methods, can be used in a number of ways when blacklisting devices. The above methods allow for before "hard" black-listing a device, the network being able to verify that the wireless device to be blacklisted is the "correct" wireless device, this is the device the wireless device identifier is associated with. Important exploits often use the application layer, e.g. the application telephone is doing many emergency random access requests. Thus, the radio modem functions of the wireless device are not compromised and can be used to perform a device verification, e.g. by using the above methods, despite the wireless device being compromised.

In other embodiments, all wireless devices are verified. Thus, when blacklisting the wireless device identifier, the wireless device is already verified. In an embodiment, a function for verifying the identity of a device is invoked in the network when needed and can be used to verify the identity before blacklisting. In another embodiment, the device verification can be invoked by a non-serving network. In another embodiment, black listing is performed automatically but can later be revoked, where the process of revoking the black-listing uses a step of verifying the device identity. In another embodiment the removal of black-listing is done using a unique (for the particular IMEI) subscription identity. It is noted that all verifications of the device, e.g. the verification of the wireless device identifier, may be performed using any of the above described methods.

In another embodiment, the wireless device identifier, IMEI, is used to verify the category of a wireless device.

In regard thereto, it is noted that an end-user can often buy a mobile device and subscription associated with a sim-card. This creates a problem if there is a segmentation of the market of subscriptions and mobile devices. The subscription can be to segment the price structure e.g. cheaper IOT subscriptions that are not supposed to be used for MBB services. The subscription may be some characteristic of the device e.g. a drone needs a special subscription to be used to both charge and offer protection due to the special interference created by drones. As another example, cars may need to fulfil special security requirements and need also a special mission critical subscription etc.

In all these examples there needs to be an verification that the device is actually the correct device associated with the IMEI if the IMEI is used to signal special properties of the device. The above described methods may be applied to the above identified technological fields and problems. For example, the wireless device identifier may be associated with or linked to a specific category of devices. Thus, by verifying the wireless device identifier with one of the above methods, these methods may be applied when verifying that a wireless device belongs to a certain category of devices. Furthermore, it is noted that another second identity or wireless device identifier other than the IMEI could be introduced and this said second identity could be used instead of using IMEI.

Another embodiment applies the above methods to trusted network segmentation.

Here the trusted networks are categorized or given a unique verification process, e.g. the verification information, verification signature, signature for two different networks is/are different. This may be due the hash function in use being specific for a specific network or a network category. In some embodiments the network segmentation is achieved by using a hash functions determined by or associated with the SIM-card used in a wireless device. In the case when the verification process, e.g. carrying out any of the above methods, includes that the network identity is used by the wireless device to determine the device key, cryptographic key, the network identity may also be used when calculating the verification signature, verification information.

The above described segmentation can be carried out according to different security categories. In an embodiment, there is a master verification process, where a master verification function, specific master verification keys, are used as described above are used but where these are only used under special circumstances. An example of special circumstances is that the regular verification process (verification method) has failed. This method can be associated with a unique trusted network, e.g. a high security network, a special services network, a high priority network, etc. In another embodiment other networks are using a sub-sequence of the master verification signature, this is the verification information obtained (calculated by using) the master verification function.

Furthermore, in an embodiment, two way part verification is used, as described above when describing FIG. 6. In another example, the hash function is defined by the SIM-card and thus unknown by the trusted node. In this case, a non-trusted network node, as depicted in FIG. 6, may calculate the hash of the verification string (random bit sequence), by using a hash function, e.g. the network hash function as described when describing FIG. 6, and transmit it to the trusted network node. The non-trusted network node may either store the hash function in advance or may be signaled, have received a transmission indicating or including the hash function to be used.

Figure 7:
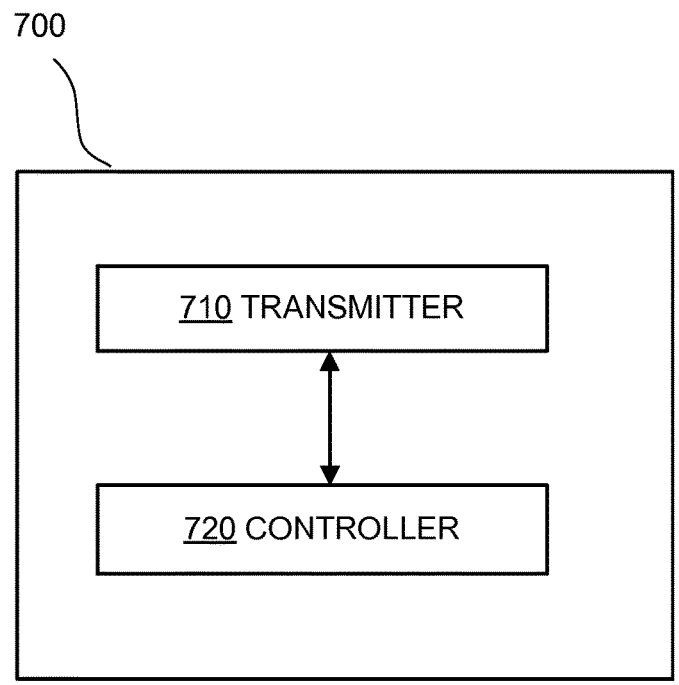
FIG. 7 illustrates elements of a wireless device according to an embodiment.

FIG. 7 depicts a configuration of a wireless device 700 illustrating possible individual functional elements of the device. Here, the wireless device 700 comprises a transmitter 710 and a controller 720. The elements, which may also be referred to as modules in the following, are adapted to carry out multiple functions, in particular, the steps/functions of the described methods, e.g. presented in FIG. 1. Regarding details of the functions of these elements/modules, it is referred to the above explanation to avoid unnecessary repetition.

In more detail, FIG. 7 illustrates elements of the device 700 configured to support verification of a wireless device identifier. The transmitter 710 is configured to transmit the wireless device identifier of the wireless device, such as the IMEI of a UE. The transmitter 710 is furthermore configured to transmit a message comprising the verification information to a trusted network node over a secure connection. The controller 720 is configured to calculate verification information from a random bit sequence by using a verification function associated with the wireless device identifier, wherein the verification function uses the cryptographic key. Specifically, the controller 720 may be one or more tangible elements or software functions running on a processor.

In one embodiment, the wireless device may have a configuration comprising a processor and a memory, said memory containing instructions executable by said processor, whereby said wireless device is operative to carry out the steps of the above methods, in particular steps 110, 120 and 130.

Figure 8:
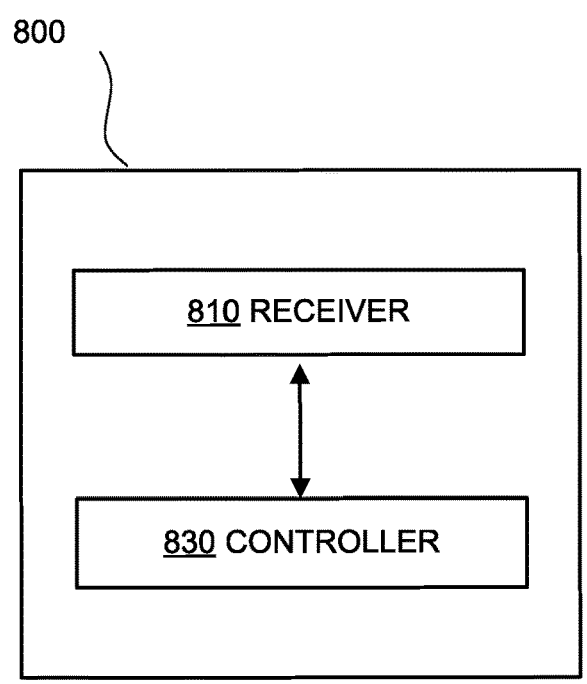
FIG. 8 illustrates elements of a network node according to an embodiment.

FIG. 8 depicts a configuration of a network node 800 illustrating possible individual functional elements of the node. Here, the node 800 comprises a receiver 810 and a controller 830. The elements are adapted to carry out multiple functions, in particular, the steps/functions of the described methods, e.g. presented in FIG. 2. Regarding details of the functions of these elements/modules, it is referred to the above explanation to avoid unnecessary repetition.

In more detail, FIG. 8 illustrates elements of the node 800 configured for verification of a wireless device identifier. The receiver 810 is configured to receive a wireless device identifier (IMEI). Furthermore, the receiver 810 is configured to receive from a wireless device over a secure connection a message comprising verification information. The controller 830 is configured to determine whether the received wireless device identifier is the wireless device identifier associated with the wireless device based on the verification information and a cryptographic key. Specifically, the controller 830 may be one or more tangible elements or software functions running on a processor.

In one embodiment, the network node 800 may have a configuration comprising a processor and a memory, said memory containing instructions executable by said processor, whereby said node is operative to carry out the steps of the above methods, in particular steps 210, 220, 230.

The above-mentioned processors may initiate or carry out at least some of the above described functions, specifically the functions discussed in the steps of the methods in FIGS. 1 and 2.

Accordingly, the same advantages which are achieved with the above described methods can also be achieved by the device and the network node. The wireless device 700 and the network node 800 may form a wireless communication system.

In particular, the receiver and transmitter may be implemented as transceiver so as to receive/transmit messages.

As is understood by the skilled person, the wireless device 700 and network node 800 may include a bus, a processing unit, a main memory, a ROM, a storage device, an I/O interface consisting of an input device and an output device, and a communication interface, such as a transceiver. The bus may include a path that permits communication among the components. Processing unit may include a processor, a microprocessor, or processing logic that may interpret and execute instructions and may form the main part of a controller, such as controllers 720, 830. Main memory may include a RAM or another type of dynamic storage device that may store information and software instructions for execution by processing unit.

The wireless device and network node may perform certain operations or processes described herein. They may perform these operations in response to processing unit executing software instructions contained in a computer-readable medium. A computer-readable medium may be defined as a physical or a logical memory device. For example, a logical memory device may include memory space within a single physical memory device or distributed across multiple physical memory devices.

The software instructions contained in a main memory may cause the processing unit including a processor, when executed on the processor, to cause the processor to perform operations or processes described herein. Alternatively, hardwired circuitry may be used in place of or in combination with software instructions to implement processes and/or operations described herein. Thus, implementations described herein are not limited to any specific combination of hardware and software.

The physical entities according to the different embodiments of the invention, including the elements, devices, nodes and systems, may comprise or store computer programs including software instructions such that, when the computer programs are executed on the physical entities, steps and operations according to the embodiments of the invention are carried out, i.e. cause processing means to carry out the operations. In particular, embodiments of the invention also relate to computer programs for carrying out the operations/steps according to the embodiments of the invention, and to any computer-readable medium storing the computer programs for carrying out the above-mentioned methods.

Where the term controller is used, no restriction is made regarding how distributed this element may be and regarding how gathered these elements may be. That is, the constituent elements may be distributed in different software and hardware components or other elements for bringing about the intended function. A plurality of distinct elements may also be gathered for providing the intended functionalities.

Figure 9:
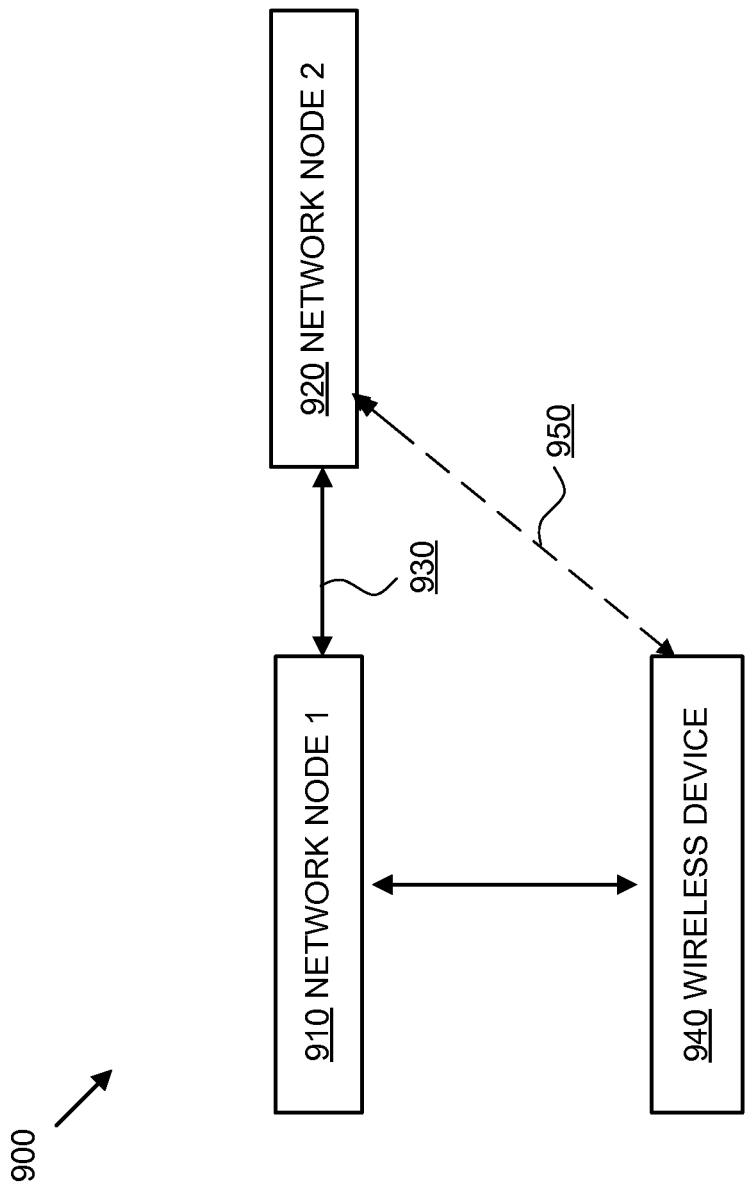
FIG. 9 illustrates how different network nodes may carry out the operations of FIGS. 2, 4, 5 and 6.

Further, the functions of the network node 800 may be distributed over several network nodes as indicated in FIG. 9 depicting two nodes. For example, network node 910 may receive and transmit messages from/to the wireless device 940 and forward the information received to network node 920 via communication channel 930. Further, it is also possible that occasionally the device 940 communicates directly with node 920 as indicated in 950. The nodes and device in FIG. 9 form system 900.

Further, the elements of the devices or nodes or system may be implemented in hardware, software, Field Programmable Gate Arrays (FPGAs), Application Specific Integrated Circuits (ASICs), firmware or the like.

It will be apparent to those skilled in the art that various modifications and variations can be made in the entities and methods of this invention as well as in the construction of this invention without departing from the scope or spirit of the invention.

The invention has been described in relation to particular embodiments and examples which are intended in all aspects to be illustrative rather than restrictive. Those skilled in the art will appreciate that many different combinations of hardware, software and/or firmware will be suitable for practising the present invention.

Moreover, other implementations of the invention will be apparent to those skilled in the art from consideration of the specification and practice of the invention disclosed herein. It is intended that the specification and the examples be considered as exemplary only, wherein abbreviations used in the above examples are listed below. To this end, it is to be understood that inventive aspects lie in less than all features of a single foregoing disclosed implementation or configuration. Thus, the true scope and spirit of the invention is indicated by the following claims.

The invention claimed is:

1. A method for performance by a wireless device for supporting verification of a wireless device identifier comprising an International Mobile Equipment Identity (IMEI) associated with the wireless device, a cryptographic key being assigned to the wireless device, the method comprising:

transmitting the IMEI to a trusted network node;

receiving a random bit sequence and a trusted network identifier from the trusted network node, the trusted network identifier known to the wireless device and comprising an indicator indicating a network associated with a subscriber identity module (SIM)-card or stored in the SIM-card used by the wireless device;

calculating verification information from the random bit sequence by using a verification function associated with the IMEI, the verification function using the cryptographic key being assigned to the wireless device;

establishing a secure connection with the trusted network node;

transmitting a verification message comprising the verification information to the trusted network node over the secure connection between the trusted network node and the wireless device, the verification information and the cryptographic key being used for verification of association of the IMEI with the wireless device; and the secure connection being established by using one of the trusted network identifier and a network encryption key associated with the trusted network identifier.

2. The method according to claim 1, further comprising:
receiving the one of the random bit sequence and the random bit sequence and the trusted network identifier from the trusted network node.

3. The method according to claim 1, wherein calculating the verification information comprises:

encrypting the random bit sequence by using the cryptographic key and an encryption function of the verification function.

4. The method according to claim 1 wherein calculating the verification information comprises:

obtaining a hashed random bit sequence by hashing the random bit sequence by using a hash function; and encrypting the hashed random bit sequence by using the cryptographic key and an encryption function of the verification function, to be used as the verification information.

5. The method according to claim 1, further comprising: generating a random bit sequence; and
transmitting the random bit sequence to the trusted network node.

6. The method according to claim 1, further comprising: obtaining the verification information by using the verification function that uses the random bit sequence and the cryptographic key; and
transmitting the verification information to the trusted network node.

7. The method according to claim 1, wherein the verification information is calculated by also using the trusted network identifier.

8. A method for verification of a wireless device identifier associated with a wireless device, the method comprising:
receiving a wireless device identifier comprising an International Mobile Equipment Identity (IMEI) by a trusted network node;
receiving, from the wireless device over a secure connection between the trusted network node and the wireless device, a verification message comprising verification information, the secure connection being established by using one of a trusted network identifier and a network encryption key associated with the trusted network identifier, the trusted network identifier known to trusted network node and the wireless device and comprising an indicator indicating a network associated with a subscriber identity module (SIM)-card or stored in the SIM-card used by the wireless device, and the verification information calculated from a random bit sequence by using a verification function associated with the IMEI; and
verifying the IMEI by determining whether the received IMEI is a wireless device identifier associated with the wireless device based on the received verification information and a cryptographic key.

9. The method according to claim 8, further comprising: transmitting one of a random bit sequence and the random bit sequence and a trusted network identifier to the wireless device.

10. The method according to claim 8, wherein the determining comprises obtaining decrypted verification information by decrypting the verification information by using a decryption function and the cryptographic key.

11. The method according to claim 10, wherein the determining comprises determining that the received wireless device identifier is the wireless device identifier associated with the wireless device if the decrypted verification information and the random bit sequence match.

12. The method according to claim 10, wherein the determining comprises:
obtaining a hashed random bit sequence by hashing the random bit sequence by using a hash function; and
determining that the received wireless device identifier is the wireless device identifier associated with the wireless device if the decrypted verification information and the hashed random bit sequence match.

13. The method according to claim 8, further comprising: generating a random bit sequence; and
transmitting a random bit sequence to the wireless device.

14. The method according to claim 13, wherein the determining comprises determining that the received wireless device identifier is the wireless device identifier associated with the wireless device if an expected verification information and the verification information match.

15. The method according to claim 13, wherein expected verification information is obtained by using a verification function that uses the random bit sequence and the cryptographic key.

16. The method according to claim 8, further comprising receiving a random bit sequence from the wireless device.

17. The method according to claim 8, wherein the trusted network identifier is selected from a set of network identifiers.

18. The method according to claim 8, wherein the verification function is unique for a wireless device identifier.

19. A wireless device for supporting verification of a wireless device identifier comprising an International Mobile Equipment Identity (IMEI) associated with the wireless device, a cryptographic key being assigned to the wireless device, the wireless device configured to:
transmit the IMEI to a trusted network node;
receive a random bit sequence and a trusted network identifier from the trusted network node, the trusted network identifier known to the wireless device and comprising an indicator indicating a network associated with a subscriber identity module (SIM)-card or stored in the SIM-card used by the wireless device;
calculate verification information from the random bit sequence by using a verification function associated with the IMEI, the verification function using the cryptographic key being assigned to the wireless device;
establish a secure connection with the trusted network node;
transmit a verification message comprising the verification information to the trusted network node over the secure connection between the trusted network node and the wireless device, the verification information and the cryptographic key being used for verification of association of the IMEI with the wireless device; and
the secure connection being established by using one of the trusted network identifier and a network encryption key associated with the trusted network identifier.

20. The wireless device of claim 19, further configured to receive the one of the random bit sequence and the random bit sequence and the trusted network identifier from the trusted network node.

21. The wireless device of claim 19, wherein calculation of the verification information comprises encrypting the random bit sequence by using the cryptographic key and an encryption function of the verification function.

22. The wireless device of claim 19, wherein calculation of the verification information comprises:
obtaining a hashed random bit sequence by hashing the random bit sequence by using a hash function; and
encrypting the hashed random bit sequence by using the cryptographic key and an encryption function of the verification function, to be used as the verification information.

23. The wireless device of claim 19, further configured to receive the random bit sequence from the trusted network node.

24. A network node of a wireless communication system for verifying a wireless device identifier associated with a wireless device wherein a cryptographic key is assigned to the wireless device, the network node configured to:
receive a wireless device identifier comprising an International Mobile Equipment Identity (IMEI) by a trusted network node;

receive, from the wireless device over a secure connection between the trusted network node and the wireless device, a verification message comprising verification information, the secure connection being established by using one of a trusted network identifier and a network encryption key associated with the trusted network identifier, the trusted network identifier known to trusted network node and the wireless device and comprising an indicator indicating a network associated with a subscriber identity module (SIM)-card or stored in the SIM-card used by the wireless device, and the verification information being calculated from a random bit sequence by using a verification function associated with the IMEI;

verify the IMEI by determining whether the received IMEI is a wireless device identifier associated with the wireless device based on the received verification information and a cryptographic key.

\* \* \* \* \*